United States Patent
Halawani et al.

(10) Patent No.: US 12,485,699 B2
(45) Date of Patent: Dec. 2, 2025

(54) SYSTEM AND METHOD USING SLIDING MAGNETS TO CONTROL MAGNETIC WHEEL ADHESION

(71) Applicant: Saudi Arabian Oil Company, Dhahran (SA)

(72) Inventors: Abdulwahab Halawani, Thuwal (SA); Fadl Abdellatif, Thuwal (SA)

(73) Assignee: Saudi Arabian Oil Company, Dhahran (SA)

(*) Notice: Subject to any disclaimer, the term of this patent is extended or adjusted under 35 U.S.C. 154(b) by 833 days.

(21) Appl. No.: 17/662,789

(22) Filed: May 10, 2022

(65) Prior Publication Data

US 2023/0364940 A1 Nov. 16, 2023

(51) Int. Cl.
*B60B 19/00* (2006.01)

(52) U.S. Cl.
CPC .................. *B60B 19/006* (2013.01)

(58) Field of Classification Search
CPC .................................... B60B 19/006
See application file for complete search history.

(56) References Cited

U.S. PATENT DOCUMENTS

| | | | |
|---|---|---|---|
| 4,013,241 A | 3/1977 | Gray | |
| 4,199,741 A | 4/1980 | Serrus Paulet | |
| 4,453,148 A | 6/1984 | Norakidze et al. | |
| 6,940,376 B2 | 9/2005 | Morita et al. | |
| 8,522,905 B2 | 9/2013 | Lama | |
| 8,604,900 B2 | 12/2013 | Kocijan | |
| 8,643,454 B2 | 2/2014 | Fullerton et al. | |
| 8,847,717 B2 | 9/2014 | Cook | |
| 10,145,451 B2 | 12/2018 | Pyrhonen et al. | |
| 11,017,927 B2 | 5/2021 | Clymer et al. | |
| 2020/0300310 A1 | 9/2020 | Kostic | |

FOREIGN PATENT DOCUMENTS

| | | |
|---|---|---|
| CA | 3059845 A1 | 4/2020 |
| GB | 721748 A | 1/1955 |
| JP | 2011172432 A | 9/2011 |
| WO | 2020097113 A1 | 5/2020 |

OTHER PUBLICATIONS

Wei Song et al.; Design of permanent magnetic wheel-type adhesion-locomotion system for water-jetting wall-climbing robot; https://journals.sagepub.com/doi/full/10.1177/1687814018787378>, last visited on Jan. 12, 2022.; Jul. 16, 2018; 24 pages.

*Primary Examiner* — S. Joseph Morano
*Assistant Examiner* — Alex Palmer
(74) *Attorney, Agent, or Firm* — Leason Ellis LLP (57) ABSTRACT

A system and method control magnetic adhesion of a wheel to a ferromagnetic surface using sliding magnets, which slide in and out of a disc. Moving the magnets into the apertures generates a magnetic flux, increasing the magnetic adhesion. The system implements the method.

20 Claims, 7 Drawing Sheets

SYSTEM AND METHOD USING SLIDING MAGNETS TO CONTROL MAGNETIC WHEEL ADHESION

FIELD OF THE DISCLOSURE

The present disclosure relates generally to magnetized wheels, and, more particularly, to a system and method using sliding magnets to control magnetic adhesion of a wheel to a ferromagnetic surface.

BACKGROUND OF THE DISCLOSURE

Magnetic wheels enable vehicles to climb and drive on ferromagnetic structures. For example, an unmanned aerial vehicle (UAV) can fly to a point on a ferromagnetic structure, perch at that point, and utilize magnetic wheels to adhere to the ferromagnetic structure. The magnetic adhesion is the result of magnetic flux passing through the surface from the magnet north pole to the magnetic south pole of a magnet in the wheel. Having a strong magnetic grip to the ferromagnetic surface is essential to prevent the vehicle from disengaging inadvertently and from falling from the ferromagnetic surface. However, a strong pulling force is required to overcome the magnetic adhesion to disengage the vehicle from the ferromagnetic surface. In order to enable vehicles to obtain a strong magnetic grip as well as easy disengagement, incorporation of a magnetic switch into the wheel is desirable.

SUMMARY OF THE DISCLOSURE

According to an embodiment consistent with the present disclosure, a system and method using sliding magnets to control magnetic adhesion of a wheel to a ferromagnetic surface.

In an embodiment, a wheel is configured to adhere magnetically to a ferromagnetic surface. The wheel comprises an inner annular disc, first and second outer annular discs, a clutch, and a motor. The inner annular disc is composed of a non-magnetic material and has a plurality of apertures disposed in the inner annular disc and configured to receive a plurality of magnets. The first outer annular disc is composed of a ferromagnetic material and is disposed on a first side of the inner annular disc. The first outer annular disc has a plurality of apertures configured to receive a plurality of resilient members, wherein each resilient member biases a respective magnet away from the first outer annular disc. The second outer annular disc is composed of a ferromagnetic material and is disposed on a second side of the inner annular disc. The second outer annular disc has a plurality of apertures configured to receive a plurality of pistons, wherein each piston engages a respective magnet to move the magnet in a respective aperture of the inner annular disc and toward the first outer annular disc.

The clutch has a base having a surface and a plurality of mounting members extending from the surface, wherein each mounting member engages a respective piston. The motor is configured to move the clutch in a linear direction. In a first configuration, the motor moves the clutch linearly toward the first outer annular disc to push the pistons to engage the magnets and to counter the biasing force of the resilient members, thereby moving the magnets into the apertures of the inner annular disc and generating a first magnetic flux between the plurality of magnets and the ferromagnetic surface to increase the adhesion of the wheel to the ferromagnetic surface. In a second configuration, the motor moves the clutch linearly away from the first outer annular disc to pull the pistons away from the magnets, wherein the biasing force of the resilient members moves the magnets out of the apertures of the inner annular disc, thereby forming air gaps in the plurality of apertures of the first outer annular disc and generating a second magnetic flux between the plurality of magnets and the ferromagnetic surface to decrease the adhesion of the wheel to the ferromagnetic surface. The second magnetic flux is less than the first magnetic flux.

The air gaps block the magnetic flux of the plurality of magnets, thereby generating the second magnetic flux. The plurality of magnets can be permanent magnets. Alternatively, the plurality of magnets can be electromagnets. The pluralities of apertures can be cylindrical. The plurality of magnets can be cylindrical. A rod can be coupled between the motor and the base of the clutch, wherein the rod moves linearly. The rod can be telescopic.

In another embodiment, a vehicle comprises a chassis, a motor, and a wheel. The wheel is coupled to the chassis and has an inner annular disc, first and second outer annular discs, a clutch, and a motor. The inner annular disc is composed of a non-magnetic material and has a plurality of apertures disposed in the inner annular disc and configured to receive a plurality of magnets. The first outer annular disc is composed of a ferromagnetic material and is disposed on a first side of the inner annular disc. The first outer annular disc has a plurality of apertures configured to receive a plurality of resilient members, wherein each resilient member biases a respective magnet away from the first outer annular disc. The second outer annular disc is composed of a ferromagnetic material and is disposed on a second side of the inner annular disc. The second outer annular disc has a plurality of apertures configured to receive a plurality of pistons, wherein each piston engages a respective magnet to move the magnet in a respective aperture of the inner annular disc and toward the first outer annular disc.

The clutch has a base having a surface and a plurality of mounting members extending from the surface, wherein each mounting member engages a respective piston. The motor is configured to move the clutch in a linear direction. In a first configuration, the motor moves the clutch linearly toward the first outer annular disc to push the pistons to engage the magnets and to counter the biasing force of the resilient members, thereby moving the magnets into the apertures of the inner annular disc and generating a first magnetic flux between the plurality of magnets and the ferromagnetic surface to increase the adhesion of the wheel to the ferromagnetic surface. In a second configuration, the motor moves the clutch linearly away from the first outer annular disc to pull the pistons away from the magnets, wherein the biasing force of the resilient members moves the magnets out of the apertures of the inner annular disc, thereby forming air gaps in the plurality of apertures of the first outer annular disc and generating a second magnetic flux between the plurality of magnets and the ferromagnetic surface to decrease the adhesion of the wheel to the ferromagnetic surface. The second magnetic flux is less than the first magnetic flux.

The air gaps block the magnetic flux of the plurality of magnets, thereby generating the second magnetic flux. The plurality of magnets can be permanent magnets. Alternatively, the plurality of magnets can be electromagnets. The pluralities of apertures can be cylindrical. The plurality of magnets can be cylindrical. A rod can be coupled between the motor and the base of the clutch, wherein the rod moves linearly. The rod can be telescopic.

In a further embodiment, a method comprises providing a wheel having an inner annular disc with apertures, magnets received in the apertures, resilient members biasing the magnets, and a clutch having pistons engaging the magnets. The method further comprises moving the clutch towards the inner annular disc to engage the magnets with the pistons, to overcome the biasing of the resilient members, and to move the magnets into the apertures, generating a magnetic flux by the magnets, and increasing magnetic adhesion of the wheel to a ferromagnetic surface.

The method further comprises moving the clutch away from the annular disc, disengaging the pistons from the magnets, applying a restorative force to the magnets from the resilient members, moving the magnets out of the apertures, forming air gaps near the magnets, negating the magnetic flux, and decreasing the magnetic adhesion of the wheel to the ferromagnetic surface. Moving the clutch comprises moving the clutch linearly. Providing the wheel comprises providing a pair of ferromagnetic outer annular discs on either side of the inner annular disc.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system and method using internal cancellation magnets to control magnetic adhesion of a wheel to a ferromagnetic surface.

Figure 1:
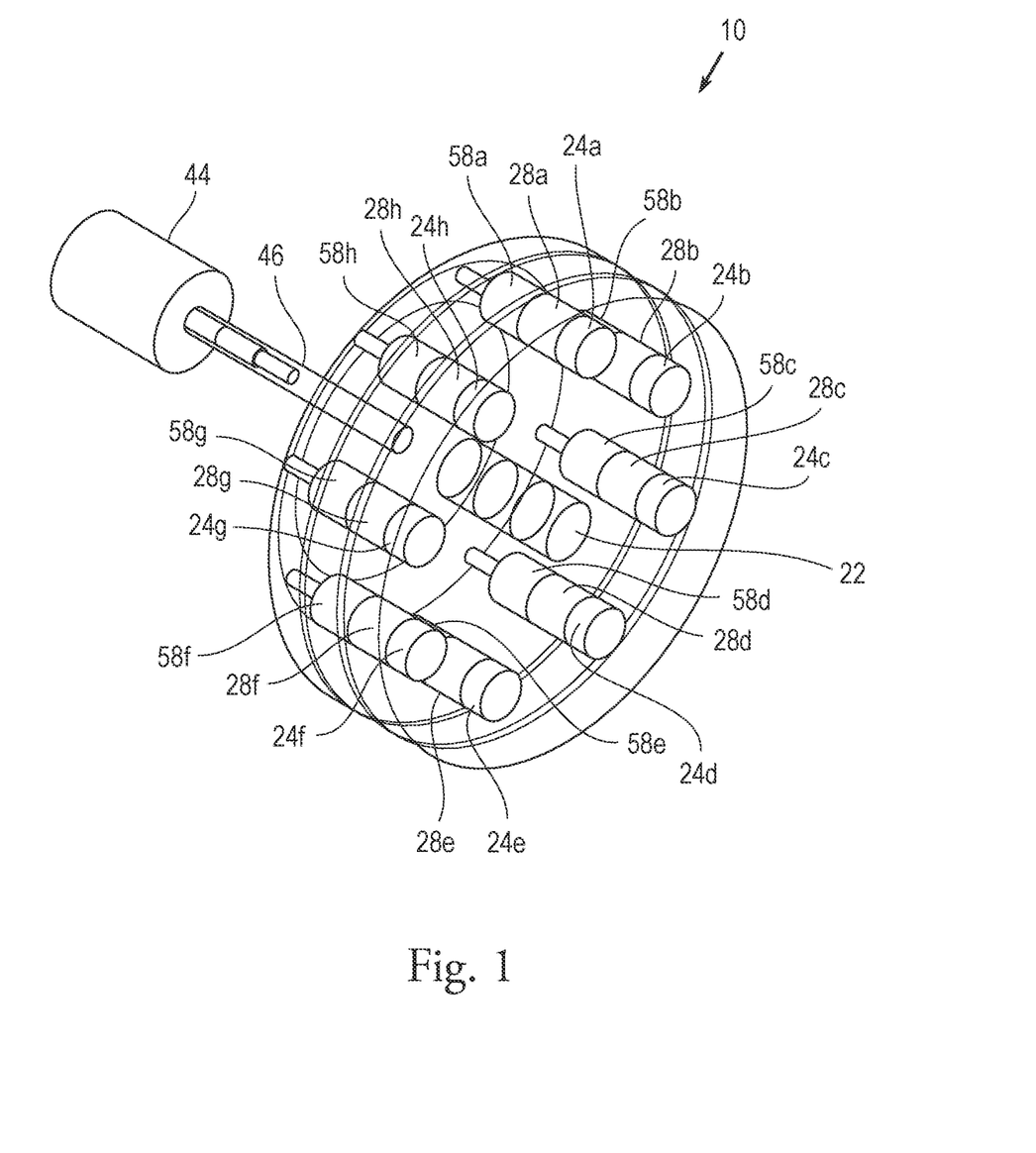
FIG. 1 is a front top side perspective view of a wheel according to an embodiment.
Figure 1A:
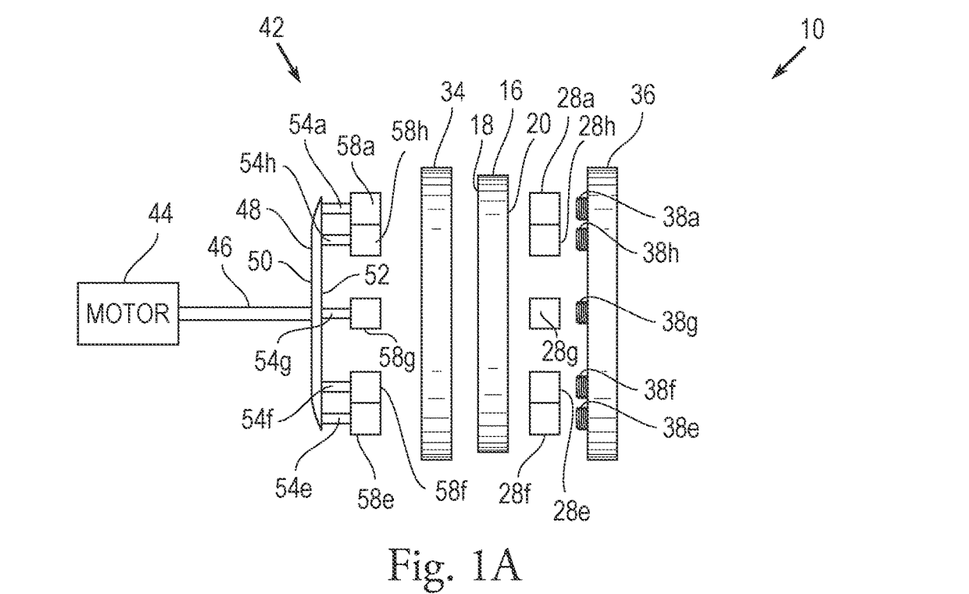
FIG. 1A is a front plan view of the wheel of FIG. 1 with parts separated.
Figure 2:
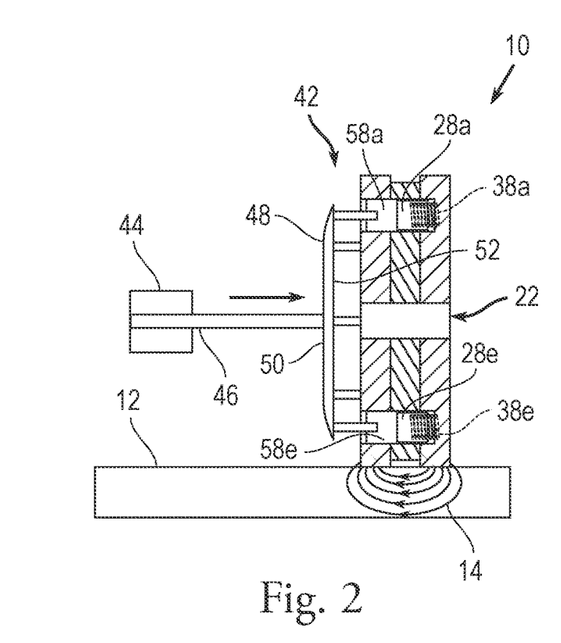
FIG. 2 is a front cross-sectional view of the wheel of FIG. 1 in a switched-on mode.
Figure 3:
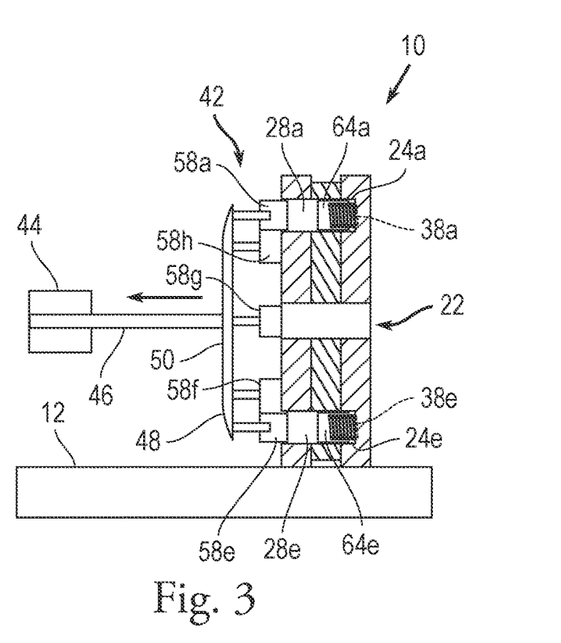
FIG. 3 is a front cross-sectional view of the wheel of FIG. 1 is a switched-off mode.

Referring to FIGS. 1-3, the wheel 10 is configured to roll on a surface 12. Using the system and method described below, when the surface 12 is ferromagnetic, a magnetic flux 14 generated by the wheel 10 can be controlled to increase or decrease magnetic adhesion of the wheel 10 to the ferromagnetic surface 12. As shown in FIGS. 1-3, the wheel 10 has an inner disc 16 having a pair of planar sides 18, 20. The inner disc 16 is composed of a non-magnetic material. The non-magnetic material can be plastic. The inner disc 16 functions as an insulator of magnetic flux 14.

The inner disc 16 is generally annular with a central axial bore 22. The central axial bore 22 is configured to receive an axle to roll the wheel 10 about the axle on the surface 12.

In the illustrated embodiment, an arrangement of eight magnets and springs is provided with even spacing and configured to move within the confines of the wheel 10 to implement control over magnetic adhesion of the wheel to a ferromagnetic surface, by cooperating with corresponding associated structures, such as the apertures, mounting members, and pistons described next. A different number of magnets and different dimensions than shown in the drawings can be provided in certain implementations, such as, by way of example only, the spacing of 5, 6, or 10 magnets instead of eight magnets as shown.

Turning to FIGS. 1-3, a plurality of apertures 24a-24h extends perpendicularly and at least partially into at least one of the planar sides 18, 20. Each of the apertures 24a-24h receives a respective magnet 28a-28h. The magnets 28a-28h are sized and dimensioned to be retained in the respective apertures 24a-24h. In an example embodiment, the apertures 24a-24h are cylindrical, and the magnets 28a-28h are also cylindrical. The magnets 28a-28h can be permanent magnets. Alternatively, the magnets 28a-28h can be electromagnets.

The wheel 10 also has a pair of outer discs 34, 36 each disposed adjacent to a respective planar side 18, 20 of the inner disc 16. Each outer disc 34, 36 is composed of a ferromagnetic material. For example, each outer disc 34, 36 can be composed of steel. Alternatively, each outer disc 34, 36 can be composed of nickel. In another alternative embodiment, each outer disc 34, 36 can be composed of cobalt. The outer discs 34, 36 can also be composed of other ferromagnetic materials. Each outer disc 34, 36 has a central axial bore aligned with the central axial bore 22 and configured to receive the axle. Each outer disc 34, 36 also includes a plurality of apertures. The outer disc 34 has apertures therethrough in which the magnets 28a-28h can slide. The outer disc 36 has apertures at least partially extending into the outer disc 36. A plurality of springs 38a-38h is disposed in respective apertures. Alternatively, any other known resilient member can be used. Each spring 38a-38h engages a respective magnet 28a-28h when the magnets 28a-28h pass through the apertures. The springs 38a-38h apply a restorative force to the magnets 28a-28h directed away from the outer disc 34.

The wheel 10 is adjacent to a clutch 42. The clutch 42 includes a motor 44 coupled to a rod 46. The motor 44 moves the rod 46 linearly along the longitudinal axis of the rod 46. Other known devices can be used instead of the motor 44 to move the rod 46 linearly. The rod 46 in turn is coupled to a base 48. The base 48 is generally circular. Alternatively, the base 48 can be any shape having a periphery. The base 48 has a first side 50 and a second side 52. The rod 46 is coupled to the first side 50 of the base 48. Mounting members 54a-54h extend from the second side 52 of the base 48. The mounting members 54a-54h are arranged around the periphery of the second side 52. A plurality of pistons 58a-58h are mounted to the mounting members 54a-54h, respectively. The pistons 58a-58h are composed of a ferromagnetic material. For example, the pistons 58a-58h can be composed of steel. Alternatively, the pistons 58a-58h can be composed of nickel. In another alternative embodiment, the pistons 58a-58h can be composed of cobalt. The pistons 58a-58h can also be composed of other ferromagnetic materials. Each of the magnets 28a-28h engages a respective piston 58a-58h, respectively.

In one embodiment, the outer disc 34 is generally circular. The apertures of the outer disc 34 are arranged around the periphery of the outer disc 34. The location of the apertures is aligned with the location of the mounting members 54a-54h, respectively. Such an alignment of the apertures and mounting members 54a-54h allows the pistons 58a-58h and the magnets 28a-28h to slide linearly in the longitudinal direction into the apertures, respectively, as shown in FIG. 2. The pistons 58a-58h and the magnets 28a-28h also slide linearly in the longitudinal direction out of the apertures, respectively, as shown in FIG. 3.

When the rod 46 moves the pistons 58a-58h, and in turn the magnets 28a-28h, longitudinally into the apertures 24a-24h, as shown in FIG. 2, the magnetic flux 14 is generated by the wheel 10. Accordingly, magnetic adhesion is generated between the wheel 10 and the ferromagnetic surface 12. Then, when the rod 46 moves the pistons 58a-58h, and in turn the magnets 28a-28h due to the restorative force of the springs 38a-38h, longitudinally out of the apertures 24a-24h, as shown in FIG. 3, air gaps 64a-64h are formed. Such air gaps 64a-64h prevent any magnetic flux of the magnets 28a-28h from being emitted to the outer discs 34, 36. Accordingly, magnetic adhesion is reduced between the wheel 10 and the ferromagnetic surface 12.

Figure 4:
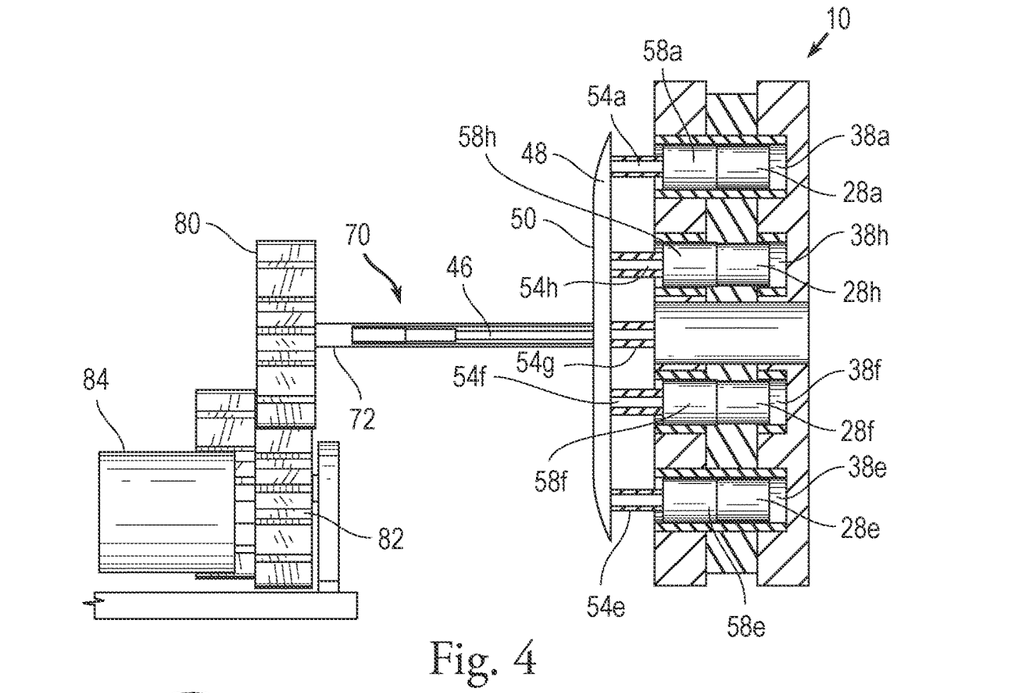
FIG. 4 is a front cross-sectional view of the wheel of FIG. 1 telescopically coupled to a sliding gear.

FIG. 4 is a front cross-sectional view of the wheel 10 of FIG. 1 telescopically coupled to a sliding gear 80. The rod 46 is connected to a telescoping shaft 70 having a telescoping member 72 connected to the sliding gear 80. The sliding gear 80 is coupled to a rotating gear 82 which is rotated by a servo motor 84.

Figure 5:
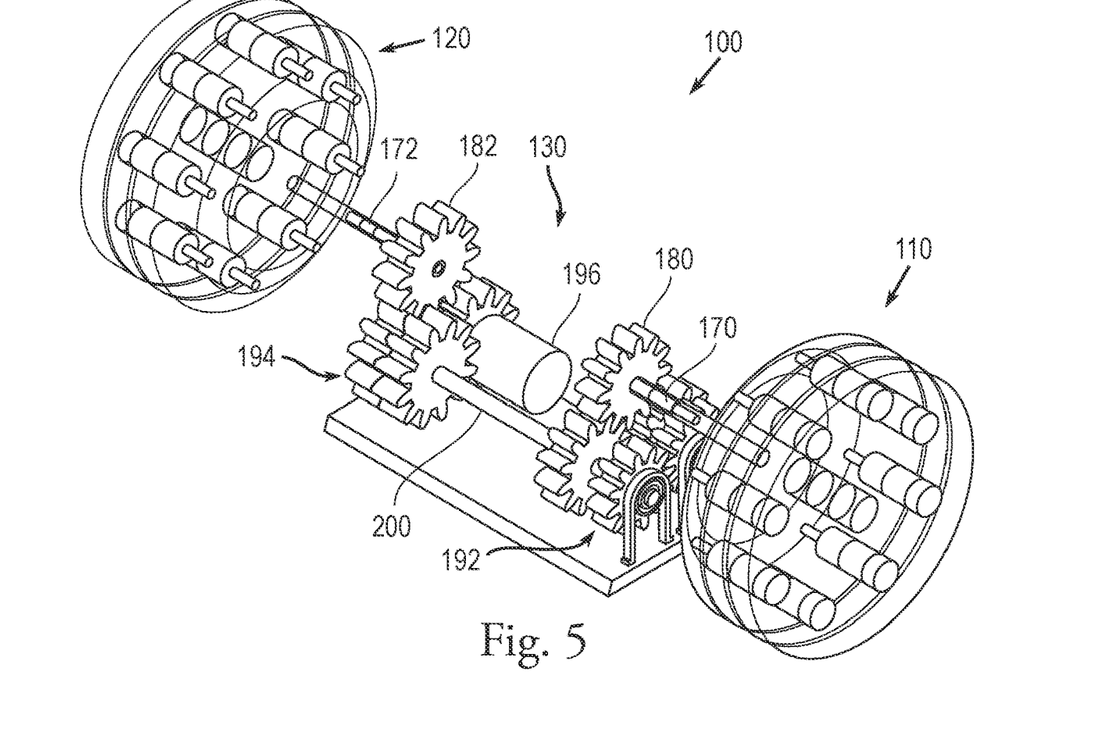
FIG. 5 is a top front side perspective view of a wheel assembly having a pair of wheels telescopically coupled to a differential gear assembly.
Figure 6:
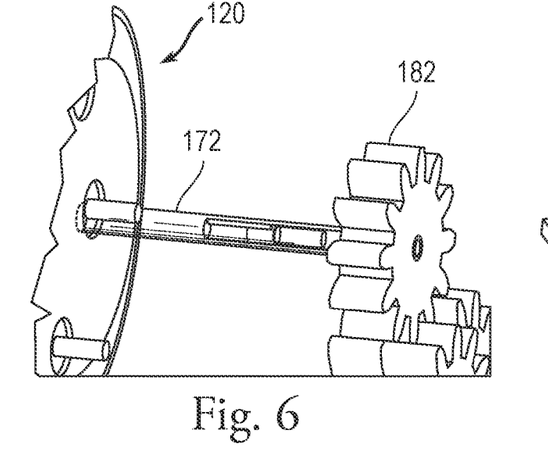
FIG. 6 is an enlarged view of a portion of a wheel and a gear shown in FIG. 5.
Figure 7:
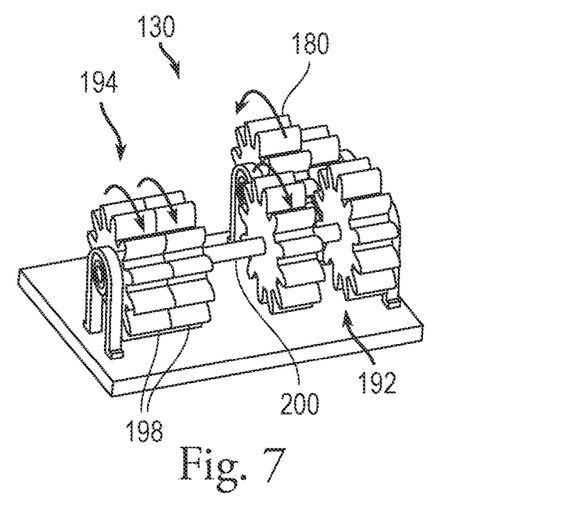
FIG. 7 is a top front side perspective view of a differential gear assembly.

FIG. 5 is a top front side perspective view of a wheel assembly 100 having a pair of wheels 110, 120 telescopically coupled to a differential gear assembly 130. FIG. 6 is an enlarged view of a portion of a wheel 120 and a gear 182 shown in FIG. 5. Each wheel 110, 120 is connected to a telescoping shaft 170, 172. The telescoping shafts 170, 172 are in turn connected to sliding gears 180, 182. The sliding gears 180, 182 are connected to rotating gears 192, 194 of the differential gear assembly 130. The rotating gears 192, 194 are driven by a servo motor 196. As described below, using the wheel assembly 100 with the differential gear assembly 130, the wheels 110, 120 can be rotated to drive forward or backward, and to steer the wheel assembly 100 as a component of a vehicle, described below in connection with FIG. 17. FIG. 7 is a top front side perspective view of the differential gear assembly 130. Rotation of the gears 198 of a left gear assembly 194, due to rotation by the servo motor 196, rotates the rod 200 which in turn rotates the right gear assembly 192. Such rotation of the right gear assembly 192 causes the sliding gear 180 to rotate in an opposite direction as the rotation of the gears 198.

Figures 8, 9, 10:
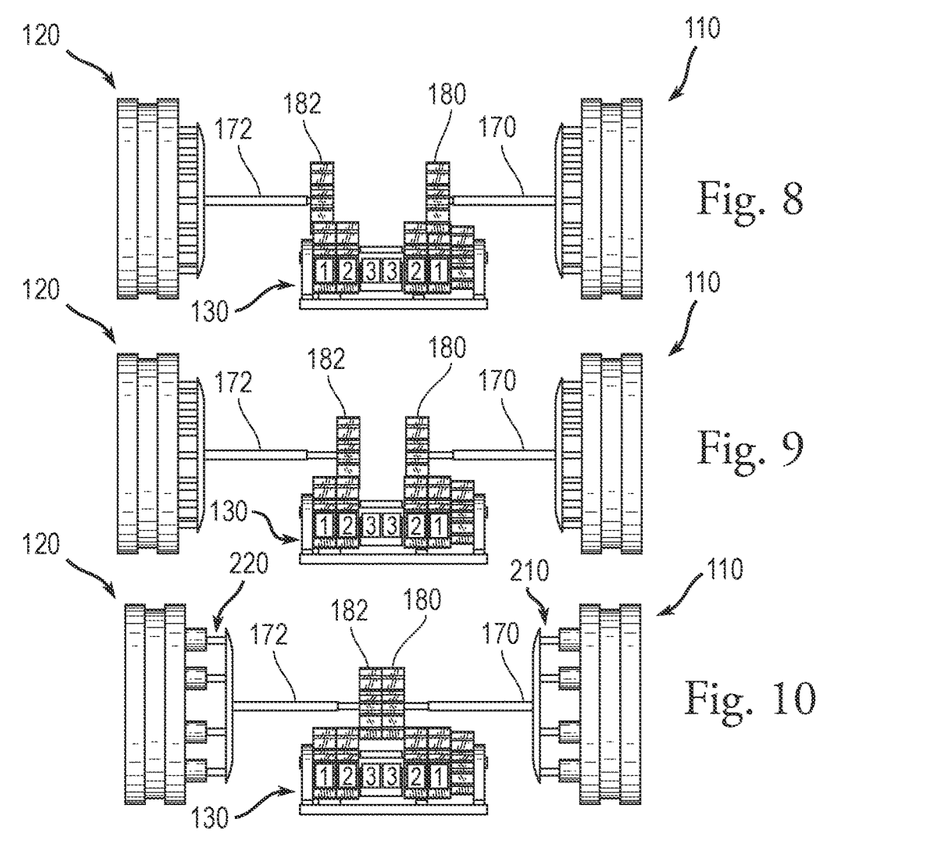
FIG. 8 is a front plan view of the wheel assembly of FIG. 5 in a first configuration operating in a steering mode.
FIG. 9 is a front plan view of the wheel assembly of FIG. 5 in a second configuration operating in a driving mode.
FIG. 10 is a front plan view of the wheel assembly of FIG. 5 in a third configuration operating in a switched-off magnetic mode.

FIG. 8 is a front plan view of the wheel assembly 100 of FIG. 5 in a first configuration operating in a steering mode. FIG. 9 is a front plan view of the wheel assembly 100 of FIG. 5 in a second configuration operating in a driving mode. FIG. 10 is a front plan view of the wheel assembly 100 of FIG. 5 in a third configuration operating in a switched-off magnetic mode. When the gears 180, 182 are placed at position 1, as shown in FIG. 8, the wheels 110, 120 rotate at different directions, allowing for steering of the wheels 110, 120 to steer the entire vehicle left or right. When the gears 180, 182 shift to position 2, as shown in FIG. 9, then the gears 180, 182 rotate with the same direction providing forward and backward motion to drive the wheels 110, 120, and in turn the entire vehicle. When the gears 180, 182 shift to position 3, as shown in FIG. 10, the gears 180, 182 are disengaged from the below gear mesh 130, and the telescopic shafts 170, 172 are extended outwardly. The third configuration shown in FIG. 10 is responsible for turning off the magnetic flux of the wheels 110, 120 as the maximum extension of the telescopic shafts 170, 172 has been reached. Therefore, the horizontal axial clutches 210, 220 of the wheels 110, 120, respectively, are displaced outside the respective wheels 110, 120, negating the magnetic flux travelling through the outer discs of the wheels 110, 120.

Referring to FIGS. 8-10, in one embodiment, a compression spring can be disposed in a cavity of each telescopic shaft 170, 172 to bias the shafts 170, 172 to remain in the most extended length of the shafts 170, 172. In an alternative embodiment, compressed gas can be disposed inside the cavity of each telescopic shaft 170, 172 to provide such biasing of the shafts 170, 172. Such embodiments of the telescopic shafts 170, 172 is advantageous when moving the gears 180, 182, respectively, from the third configuration shown in FIG. 10 to the second configuration shown in FIG. 9. Such moving of the gears 180, 182 using the shafts 170, 172 with the compression spring or compressed gas does not push the shafts 170, 172 to the original location of the shafts 170, 172, respectively.

Figure 11:
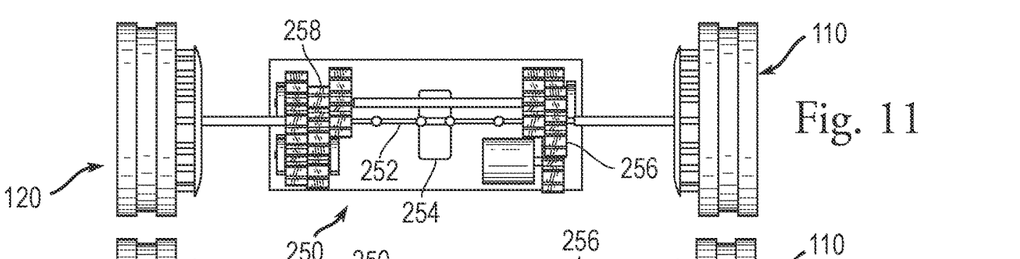
FIG. 11 is a top view of an alternative wheel assembly in a first configuration operating in a steering mode.
Figures 12, 13:
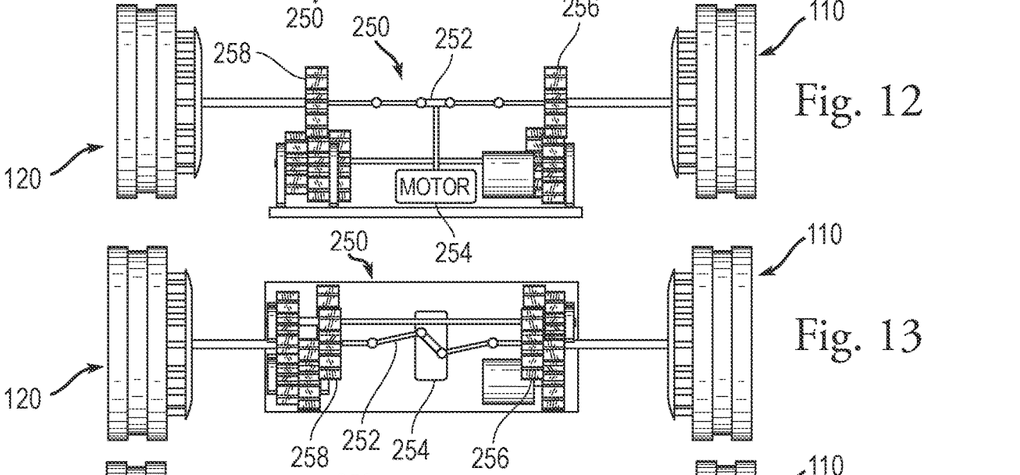
FIG. 12 is a front view of the alternative wheel assembly of FIG. 11 in the first configuration operating in the steering mode.
FIG. 13 is a top view of the alternative wheel assembly in a second configuration operating in a driving mode.

FIG. 11 is a top view of an alternative wheel assembly 250 in a first configuration operating in a steering mode. FIG. 12 is a front view of the alternative wheel assembly 250 of FIG. 11 in the first configuration operating in the steering mode. In the wheel assembly 250, a mechanical linkage 252 is operated by a servo motor 254 to push the gears 256, 258 outwardly into the first position.

Figures 14, 15, 16:
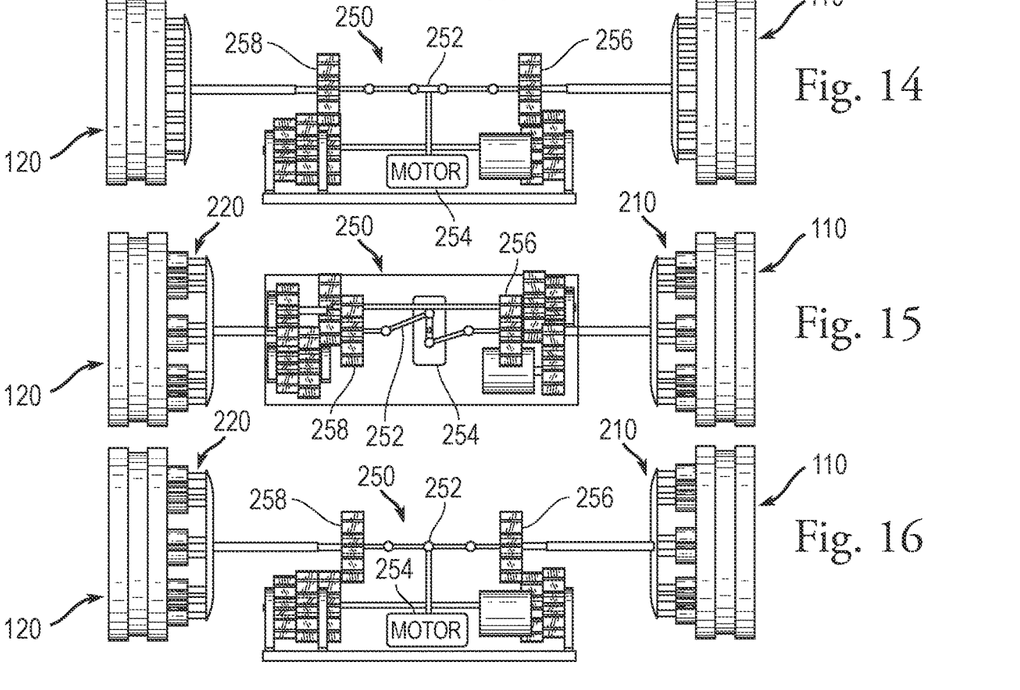
FIG. 14 is a front view of the alternative wheel assembly of FIG. 11 in the second configuration operating in the driving mode.
FIG. 15 is a top view of an alternative wheel assembly in a third configuration operating in a switched-off magnetic mode.
FIG. 16 is a front view of the alternative wheel assembly of FIG. 11 in the third configuration operating in the switched-off magnetic mode.

FIG. 13 is a top view of the alternative wheel assembly 250 in a second configuration operating in a driving mode. FIG. 14 is a front view of the alternative wheel assembly 250 of FIG. 11 in the second configuration operating in the driving mode. In the wheel assembly 250, the servo motor 254 pulls the mechanical linkage 252 inwardly to slide the gears 256, 258 into the second position.

FIG. 15 is a top view of an alternative wheel assembly 250 in a third configuration operating in a switched-off magnetic mode. FIG. 16 is a front view of the alternative wheel assembly 250 of FIG. 11 in the third configuration operating in the switched-off magnetic mode. In the wheel assembly 250, the servo motor 254 pulls the mechanical linkage 252 further inwardly to slide the gears 256, 258 into the third position. With the wheel assembly 250 in the third position, the clutches 210, 220 pull the magnets from each wheel 110, 120, respectively, to negate the magnetic flux and so to reduce the adhesion of the wheels 110, 120 to the ferromagnetic surface.

Figure 17:
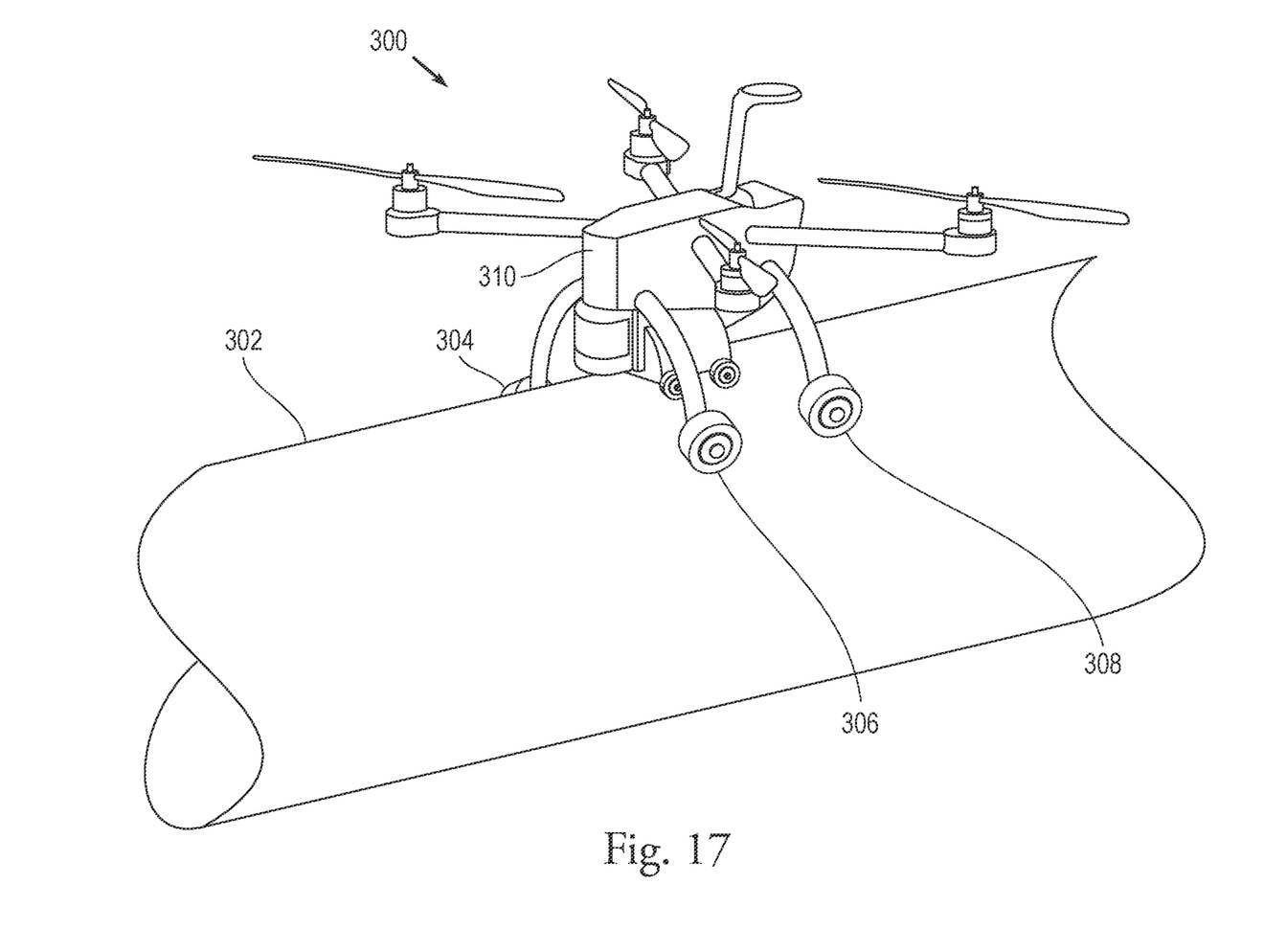
FIG. 17 illustrates a vehicle incorporating the wheels and wheel assemblies of FIGS. 1-16.

FIG. 17 illustrates a vehicle 300 incorporating the wheels and wheel assemblies of FIGS. 1-16. These wheels and wheel assemblies can be used if there is at least one magnetic wheel in the vehicle or system, such as a UAV 300 shown in FIG. 17. The UAV 300 can fly to a ferromagnetic surface 302, perch on the ferromagnetic surface 302 using the at least one wheel 304, 306, 308, and drive or crawl along the ferromagnetic surface 302 using controlled magnetic adhesion as described above. Each wheel assembly is disposed in a chassis 310 to which the wheels 304, 306, 308 are coupled. The wheel assemblies allows for selective switching of the magnetic flux of the wheels 304, 306, 308, respectively. The wheel assemblies also drive at least one of the wheels 304, 306, 308 forward or backward along the length of the ferromagnetic surface. The wheel assemblies are used for controlling wheels 304, 306, 308 of vehicles such as the UAV 300. Such wheel assemblies can employ differential driving or steering, such that the vehicle can drive forward/backward or steer right/left. Such wheel assemblies also allow for selective switching of the magnetic flux of the wheels 304, 306, 308. The advantage of these wheel assemblies includes optimization and also reduction of the number of components, since the wheels 304, 306, 308 can now share some components to perform the desired driving and steering functions.

Figure 18:
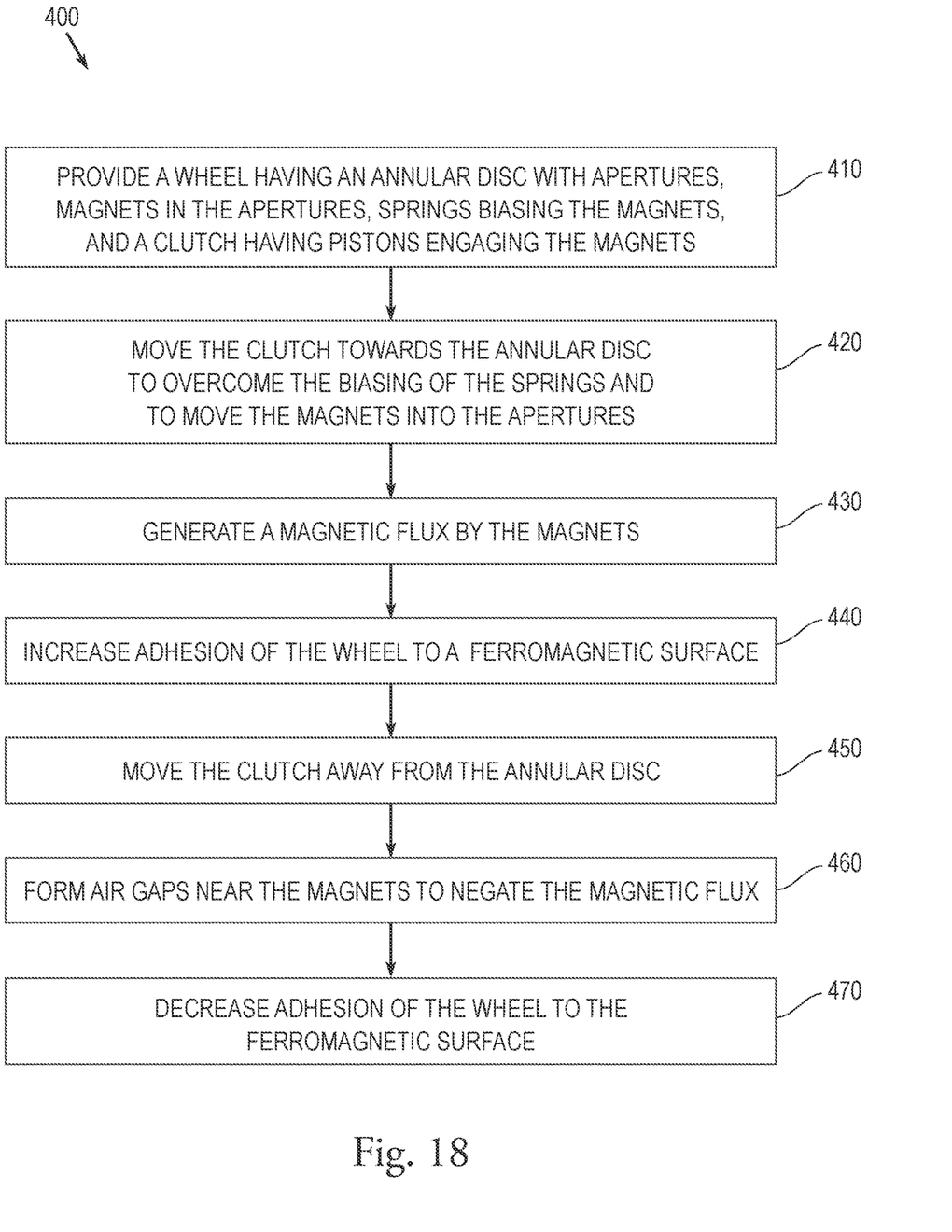
FIG. 18 is a flowchart of the method of operation of the wheel of FIG. 1.

As shown in FIG. 18, a method 400 includes the step of providing the wheel 10 of FIGS. 1-3 in step 410, with the wheel 10 having a first annular disc 16 with apertures 24a-24h configured to receive magnets 28a-28h, with springs 38a-38h biasing the magnets 28a-28h, and with a clutch 42 having pistons 58a-58h configured to engage the magnets 28a-28h, respectively. The method 400 then moves the clutch 42 towards the first annular disc 16 in step 420 to overcome the biasing force of the springs 38a-38h and to move the magnets 28a-28h into the apertures 24a-24h. A magnetic flux 14 is generated by the magnets 28a-28h in step 430, and adhesion of the wheel 10 to a ferromagnetic surface 12 is increased in step 440. The method 400 then moves the clutch 42 away from the first annular disc 16 in step 450, and air gaps 64a-64h are formed near the magnets 28a-28h in step 460 which negate the magnetic flux 14. Adhesion of the wheel 10 to the ferromagnetic surface 12 is then decreased in step 470.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A wheel configured to adhere magnetically to a ferromagnetic surface, comprising:
   an inner annular disc composed of a non-magnetic material and having:
      a first plurality of apertures disposed in the inner annular disc and configured to receive a plurality of magnets; and
   a first outer annular disc composed of a ferromagnetic material and disposed on a first side of the inner annular disc, with the first outer annular disc having:

a second plurality of apertures configured to receive a plurality of resilient members, wherein each resilient member of the plurality of resilient members biases a respective magnet of the plurality of magnets away from the first outer annular disc;
a second outer annular disc composed of a ferromagnetic material and disposed on a second side of the inner annular disc, with the second outer annular disc having:
a third plurality of apertures configured to receive a plurality of pistons, wherein each piston of the plurality of pistons engages a respective magnet of the plurality of magnets to move the magnet in a respective aperture of the first plurality of apertures of the inner annular disc and toward the first outer annular disc;
a clutch having:
a base having a surface; and
a plurality of mounting members extending from the surface, wherein each mounting member engages a respective piston; and
a motor configured to move the clutch in a linear direction;
wherein in a first configuration, the motor moves the clutch linearly toward the first outer annular disc to push each piston of the plurality of pistons to engage a respective magnet of the plurality of magnets and to counter the biasing force of a respective resilient member of the plurality of resilient members, thereby moving respective magnet of the plurality of magnets into a respective aperture of the first plurality of apertures of the inner annular disc and generating a first magnetic flux between the plurality of magnets and the ferromagnetic surface to increase the adhesion of the wheel to the ferromagnetic surface, and
wherein in a second configuration, the motor moves the clutch linearly away from the first outer annular disc to pull each piston of the plurality of pistons away from a respective magnet of the plurality of magnets, wherein the biasing force of each resilient member of the plurality of resilient members moves each magnet of the plurality of magnets out of each aperture of the first plurality of apertures of the inner annular disc, thereby forming air gaps in each aperture of the second plurality of apertures of the first outer annular disc and generating a second magnetic flux between the plurality of magnets and the ferromagnetic surface to decrease the adhesion of the wheel to the ferromagnetic surface, wherein the second magnetic flux is less than the first magnetic flux.

2. The wheel of claim 1, wherein the air gaps block the first magnetic flux of the plurality of magnets, thereby generating the second magnetic flux.

3. The wheel of claim 1, wherein each magnet of the plurality of magnets is a permanent magnet.

4. The wheel of claim 1, wherein each magnet of the plurality of magnets is an electromagnet.

5. The wheel of claim 1, wherein each aperture of the first plurality of apertures is cylindrical.

6. The wheel of claim 5, wherein each magnet of the plurality of magnets is cylindrical.

7. The wheel of claim 1, further comprising:
a rod coupled between the motor and the base of the clutch, wherein the rod moves linearly.

8. The wheel of claim 7, wherein the rod is telescopic.

9. A vehicle, comprising:
a chassis;
a motor disposed in the chassis; and
a wheel coupled to the motor and having:
an inner annular disc composed of a non-magnetic material and having:
a first plurality of apertures disposed in the inner annular disc and configured to receive a plurality of magnets; and
a first outer annular disc composed of a ferromagnetic material and disposed on a first side of the inner annular disc, with the first outer annular disc having:
a second plurality of apertures configured to receive a plurality of resilient members, wherein each resilient member of the plurality of resilient members biases a respective magnet of the plurality of magnets away from the first outer annular disc;
a second outer annular disc composed of a ferromagnetic material and disposed on a second side of the inner annular disc, with the second outer annular disc having:
a third plurality of apertures configured to receive a plurality of pistons, wherein each piston of the plurality of pistons engages a respective magnet of the plurality of magnets to move the respective magnet of the plurality of magnets in a respective aperture of the first plurality of apertures of the inner annular disc and toward the first outer annular disc; and
a clutch having:
a base having a surface; and
a plurality of mounting members extending from the surface, wherein each mounting member of the plurality of mounting members engages a respective piston of the plurality of pistons; and
wherein the motor is configured to move the clutch in a linear direction;
wherein in a first configuration, the motor moves the clutch linearly toward the first outer annular disc to push each piston of the plurality of pistons to engage a respective magnet of the plurality of magnets and to counter the biasing force of the plurality of resilient members, thereby moving each magnet of the plurality of magnets into a respective aperture of the first plurality of apertures of the inner annular disc and generating a first magnetic flux between the plurality of magnets and a ferromagnetic surface to increase the adhesion of the wheel to the ferromagnetic surface, and
wherein in a second configuration, the motor moves the clutch linearly away from the first outer annular disc to pull each piston of the plurality of pistons away from a respective magnet of the plurality of magnets, wherein the biasing force of the plurality of resilient members moves each magnet of the plurality of magnets out of a respective aperture of the first plurality of apertures of the inner annular disc, thereby forming air gaps in the second plurality of apertures of the first outer annular disc and generating a second magnetic flux between the plurality of magnets and the ferromagnetic surface to decrease the adhesion of the wheel to the ferromagnetic surface,
wherein the second magnetic flux is less than the first magnetic flux.

10. The vehicle of claim 9, wherein the air gaps block the first magnetic flux of the plurality of magnets, thereby generating the second magnetic flux which is less than the first magnetic flux.

11. The vehicle of claim 9, wherein each of the plurality of magnets is a permanent magnet.

12. The vehicle of claim 9, wherein each of the plurality of magnets is an electromagnet.

13. The vehicle of claim 9, wherein each aperture of the first plurality of apertures is cylindrical.

14. The vehicle of claim 13, each of the plurality of magnets is cylindrical.

15. The vehicle of claim 9, further comprising:
a rod coupled between the motor and the base of the clutch, wherein the rod moves linearly.

16. The vehicle of claim 15, wherein the rod is telescopic.

17. A method, comprising:
providing a wheel having an inner annular disc with apertures, magnets sized and dimensioned to be received in the apertures, resilient members biasing the magnets, and a clutch having pistons configured to engage the magnets;
moving the clutch towards the inner annular disc to engage the magnets with the pistons, to overcome the biasing of the resilient members on the magnets, and to move the magnets into the apertures;
generating a magnetic flux by the magnets; and
increasing magnetic adhesion of the wheel to a ferromagnetic surface.

18. The method of claim 17, further comprising:
moving the clutch away from the annular disc;
disengaging the pistons from the magnets;
applying restorative forces to the magnets from the resilient members;
moving the magnets out of the apertures;
forming air gaps near the magnets;
negating the magnetic flux; and
decreasing the magnetic adhesion of the wheel to the ferromagnetic surface.

19. The method of claim 17, wherein moving the clutch comprises:
moving the clutch linearly.

20. The method of claim 17, wherein providing the wheel comprises:
providing a pair of ferromagnetic outer annular discs on either side of the inner annular disc.

* * * * *